United States Patent
Terada

(10) Patent No.: US 7,307,216 B2
(45) Date of Patent: Dec. 11, 2007

(54) ELECTRIC WIRE EXCESSIVE LENGTH ABSORPTION DEVICE

(75) Inventor: Tomoyasu Terada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/566,986

(22) PCT Filed: Jul. 27, 2004

(86) PCT No.: PCT/JP2004/010658

§ 371 (c)(1),
(2), (4) Date: Feb. 2, 2006

(87) PCT Pub. No.: WO2005/013451

PCT Pub. Date: Feb. 10, 2005

(65) Prior Publication Data
US 2006/0213677 A1    Sep. 28, 2006

(30) Foreign Application Priority Data
Aug. 4, 2003  (JP) .............................. 2003-286239

(51) Int. Cl.
H01B 7/00    (2006.01)
(52) U.S. Cl. .................. 174/72 A; 174/68.3; 174/73.1
(58) Field of Classification Search .............. 174/72 A, 174/68.3, 73.1
See application file for complete search history.

(56) References Cited

U.S. PATENT DOCUMENTS 5,877,936 A * 3/1999 Nishitani et al. .............. 439/34

6,575,760 B2 * 6/2003 Doshita et al. ................ 439/34

FOREIGN PATENT DOCUMENTS

| JP | 2-97830     | 8/1990  |
|----|-------------|---------|
| JP | 2001-103644 | 4/2001  |
| JP | 2001-218350 | 8/2001  |
| JP | 2002-67828  | 3/2002  |
| JP | 2002-325347 | 11/2002 |

* cited by examiner

Primary Examiner—Jinhee Lee
(74) Attorney, Agent, or Firm—Kratz, Quintos & Hanson, LLP

(57) ABSTRACT

There is provided a wire harness excessive length absorbing device that allows a slim case body thereof, and provides a large installation space for other components. The wire harness excessive length absorbing device includes a case (30) for receiving a wire harness (25) having an inlet (34) and an outlet (35) for the wire harness (25); an urging member (23) for urging the wire harness (25) toward an inside of the case (30); and a harness roller (15) on which the wire harness (25) being rolled, said harness roller (15) reciprocally moving under acting forth of the urging member (23), a harness guide (17) mounted on the outlet (35) and curved toward the inlet (34) for guiding the harness (25) to the outside of the case (30). The harness guide (17) is curved in the same direction as a direction of the wire harness being rolled (25) on the harness roller (15). The outlet (35) is disposed in a direction perpendicular to that of the inlet (34).

4 Claims, 2 Drawing Sheets

ELECTRIC WIRE EXCESSIVE LENGTH ABSORPTION DEVICE

TECHNICAL FIELD

This invention relates to a device for absorbing an excessive length of a wire harness interposed between a vehicle body as a fixed object to which the wire harness is fixed, and an openable and closable door as a sliding object mounted on the vehicle body.

BACKGROUND ART

As is generally known, various electric components are installed in a vehicle or the like. Power and signal currents are supplied to these electric components through a wire harness.

The wire harness is a tube that ties a plurality of electric wires. Various wire harnesses are used corresponding to applications or locations. For example, a flexible flat cable in which a plurality of wiring conductors are arranged in parallel is used for connecting electric components in a vehicle door on which a power window motor, a door lock unit, a switch unit, an automatic door open/close unit and the like are installed.

Travel distance of the wire harness for the door or the like is large due to the open/close of the door. Therefore, when the door is closed, an excessive length is generated in the wire harness and may be caught between the vehicle body and the door and damaged. An example of a conventional wire harness excessive length absorbing device 50 for solving such a problem is shown in FIG. 6.

As shown in FIG. 6, the excessive length absorbing device 50 includes: a wire harness 25; a case 30 having a case body 31 and a cover 37; and an excessive length absorbing unit 12 received in the case 30.

A so-called flat wire harness such as a flexible flat cable (FFC) is used as the wire harness 25. The case body 31 is a horizontally rectangular box having an opening. The cover 37 covers the opening of the case body 31. A not-shown locking piece is formed on a frame of the case body 31. A not-shown locking projection is formed on a frame 38 of the cover 37. By engaging the locking piece with the locking projection, the cover 37 is attached to the case body 31.

The excessive length absorbing unit 12 includes a seat member 13, a guiding pin 27, a compressed coil spring 23, and a harness roller 15. The guiding pin 27 is arranged in a longitudinal direction of the case body 31. One end of the guiding pin 27 is fixed to the rear wall of the case body 31 through the seat member 13.

The compressed coil spring 23 is installed to cover the guiding pin 27 and to push the wire harness 25 into the case 30. The harness roller 15 has a trunk attached to the guiding pin 27. The harness roller 15 is allowed to reciprocally move in a direction to pulling forward/backward the wire harness 25 rolled in a U-shape thereon.

Thus, an excessive length 26 of the wire harness 25 is pulled into or out of the case 30 accompanying the open/close of the door or the like. Therefore, the wire harness 25 is constantly strained and the damage of the excessive length 26 caught by the door is prevented.

DISCLOSURE OF THE PRESENT INVENTION

Problem to be Solved by the Invention

However, there are problems to be solved in the conventional wire harness excessive length absorbing device 50 as described below.

One problem is that since a harness guide 51 formed integrally with the inlet protrudes outward from a base wall 31a of the case body 31, a thickness of the case 30 increases and a installation space for the other components in a door or the like is limited.

If a radius of corner of the harness guide 51 is increased for bending the wire harness 25 smoothly without any damage, the protrusion of the harness guide 51 outward from the case is also increased, thereby the installation space for the other components is further decreased.

In addition, the wire harness 25 is pulled into the case 30 through the harness inlet 34, and the excessive length 26 is folded in a U-shape and received in the case 30. The wire harness 25 is pulled out from the harness outlet 35 and bent along the harness guide 51. Accordingly, the wire harness 25 is bent twice in different directions by the harness roller 15 and the harness guide 51. Therefore, there is another problem that a resistance against pulling out the wire harness 25 is too large to smoothly pull out the wire harness 25.

Accordingly, an object of the present invention is to provide a slim wire harness excessive length absorbing device providing a large installation space for other components and allowing a smooth movement of the wire harness.

Means for Solving the Problem

For attaining the object, according to the present invention, there is provided a wire harness excessive length absorbing device including:

a case for receiving a wire harness having an inlet and an outlet for the wire harness;

an urging member for urging the wire harness toward an inside of the case; and a harness roller on which the wire harness being rolled, said harness roller reciprocally moving under acting force of the urging member, a harness guide mounted on the outlet and curved toward the inlet for guiding the harness to the outside of the case.

According to the above, when the urge of the urging member pulls the wire harness strongly, the wire harness is pulled out of the case, or else, the wire harness is pulled into the case. Therefore, the pulled wire harness is prevented from being broken or caught at the excessive length thereof between the fixed vehicle body and the movable sliding door. Further, since the wire harness is moved along the harness guide mounted on the outlet when the door opens or closes, the wire harness is prevented from being worn and damaged at an edge of the case. Further, since the harness guide is curved toward the inlet, a height of the outer protrusion of the harness guide in a thickness direction of the case is reduced.

According to the present invention, there is provided the wire harness excessive length absorbing device, wherein the harness guide is curved in the same direction as a direction of the wire harness being rolled on the harness roller.

According to the above, the height of the outer protrusion of the harness guide in the thickness direction of the case can be reduced. Further, since the wire harness is pulled in or out in a round path, the wire harness is allowed to be smoothly pulled in or out.

According to the present invention, there is provided the wire harness excessive length absorbing device, wherein a radius of corner of the harness guide is formed equal to or larger than a thickness of the case.

According to the above, repetitive bending stress is dispersed and not concentrated in a curved part of the wire harness, so that the wire harness is prevented from being broken or the like.

According to the present invention, there is provided the wire harness excessive length absorbing device, wherein the outlet is disposed in a direction perpendicular to that of the inlet.

According to the above, since the outlet and the inlet are disposed in directions perpendicular to each other, the wire harness pulled into the case through the inlet and the wire harness pulled out of the case through the outlet are prevented from interfering with each other.

Effect of Invention

According to the present invention, since the harness guide is curved toward the inlet, the harness guide is allowed to be bent in the corner radius including the thickness of the case, the height of the protrusion of the harness guide outward from the case can be reduced. Therefore, the case body is allowed to be slim, and the installation space for the other components increases.

According to the present invention, the harness guide is curved in the same direction as a direction of the wire harness being rolled on the harness roller. Therefore, the height of the protrusion of the harness guide outward from the case can be reduced. Moreover, the wire harness is reciprocally moved in a round path. Therefore, the wire harness is allowed to be smoothly pulled in or out.

According to the present invention, the radius of corner of the harness guide is formed equal to or larger than a thickness of the case. Therefore, repetitive bending stress is dispersed and not concentrated in a curved part of he wire harness. Therefore, the wire harness is prevented from being broken or the like, and reliability of electric connection of the wire harness is maintained.

According to the present invention, the outlet and the inlet are formed in the directions perpendicular to each other, the wire harness pulled into the case through the inlet and the wire harness pulled out of the case through the outlet are prevented from interfering with each other.

Figure 1:
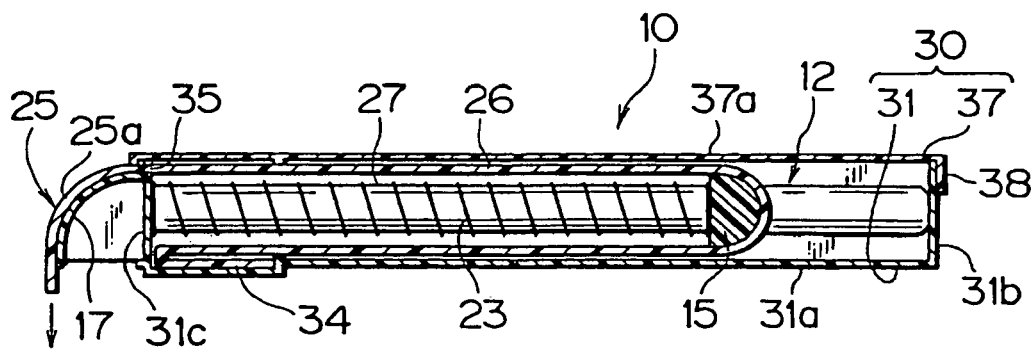
FIG. 1 is a longitudinal sectional view showing a wire harness excessive length absorbing device according to an embodiment of the present invention.

EXPLANATIONS OF LETTERS OR NUMERALS 10 wire harness excessive length absorbing device
15 harness roller
17 harness guide
23 compressed coil spring (urging member)
25 wire harness
27 guiding pin (guided member)
30 case
31c rear wall
31d sidewall
34 harness inlet (inlet)
35 harness outlet (outlet)

BEST MODE FOR CARRYING OUT THE INVENTION

Hereunder, an embodiment of the present invention will be explained with reference to figures. FIGS. 1 to 5 show a wire harness excessive length absorbing device 10 according to the embodiment of the present invention. In order to avoid repetitions, identical elements will be designated by identical reference numerals and only the differences existing in comparison with the embodiment of the conventional wire harness excessive length absorbing device 50 will be explained.

The wire harness excessive length absorbing device 10 absorbs an excessive length (slack) 26 of a wire harness 25 interposed between a vehicle body as a fixing object (not shown) and a door as a movable object (not shown). Here, a scope of the door includes a rotary door or sliding door. The movable object is not limited to the door. For example, a trunk or a hatch may be used as the movable object.

As shown in FIG. 1, the wire harness excessive length absorbing device 10 includes the wire harness 25 as a flat circuit body, a case 30 made of synthetic resin, an excessive length absorbing unit 12 received in the case 30.

A band-shaped flexible flat cable (FFC), of which parallel wiring conductors are covered by insulating covering material 25a, is used as the wire harness 25. However, any cable is acceptable as long as the cable is foldable in a curve shape. A flexible print circuit (FPC) may be used as the wire harness 25.

Both the FFC and the FPC are coated wires to carry mainly signal currents between electric components of the vehicle (some of them carry power source, however, they incline to be less resilient because of their heavy wires). The number of wires corresponds to the number of terminals received in connectors (not shown) disposed at the vehicle body or the door. The covering material 25a covering the electric wires is a so-called insulating sheet made of polyvinyl chloride, polyethylene, or the like.

The FFC and the FPC are flexible and are foldable in a desired shape corresponding to a wiring route. Accordingly, even when the FFC and the FPC are folded in a U-shape and received in the wire harness excessive length absorbing device 10, the FFC and the FPC have no damage, and reliability of electrical connection with the FFC and the FPC is not reduced.

Figure 2:
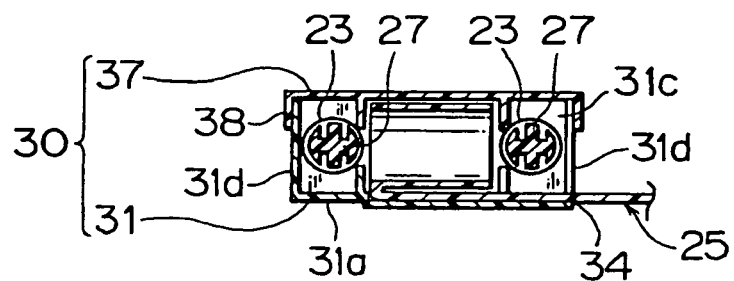
FIG. 2 is a cross sectional view showing the wire harness excessive length absorbing device according to the present invention.

The case 30 includes a case body 31 and a cover 37. The case 31 is formed in a box shape having an opening at a top thereof, a lower base wall 31a, and frame walls standing on edges of the base wall 31a. The top of the case 30 is open. The frame walls are in lateral rectangular shapes. The frame walls include a front and rear walls 31b, 31c opposite to each other (FIG. 4), and both sidewalls 31d, 31d opposite to each other (FIG. 2). L-shaped locking pieces 32 for locking the cover 37 are formed on the rear and front walls 31b, 31c and the sidewalls 31d, 31d (FIG. 5).

Not-shown clipping ribs and not-shown clipping projections are formed on the front wall 31b. Each one pair of the clipping rib and the clipping projection is disposed on top and bottom parts of one guiding pin 27 (guiding member), so that the pair of the clipping rib and the clipping projection catches and holds the guiding pin 27. The clipping rib and the clipping projection will be explained in the other patent application, and further explanation will be omitted in this application.

A notched harness outlet (outlet) 35 is formed on the rear wall 31c. The outlet 35 is formed near the opening of the case body 31. A slot-shaped harness inlet (inlet) 34 is formed near the rear wall 31c.

Figure 3:
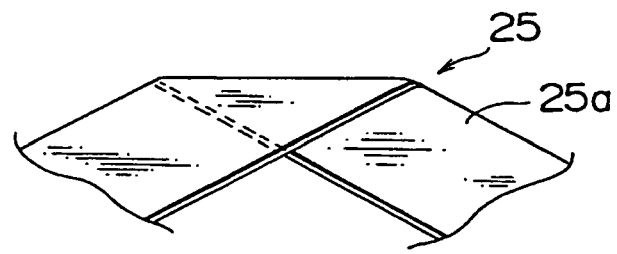
FIG. 3 is a perspective view showing a folded wire harness to be pulled into a case through an inlet of the wire harness excessive length absorbing device according to the present invention.
Figure 6:
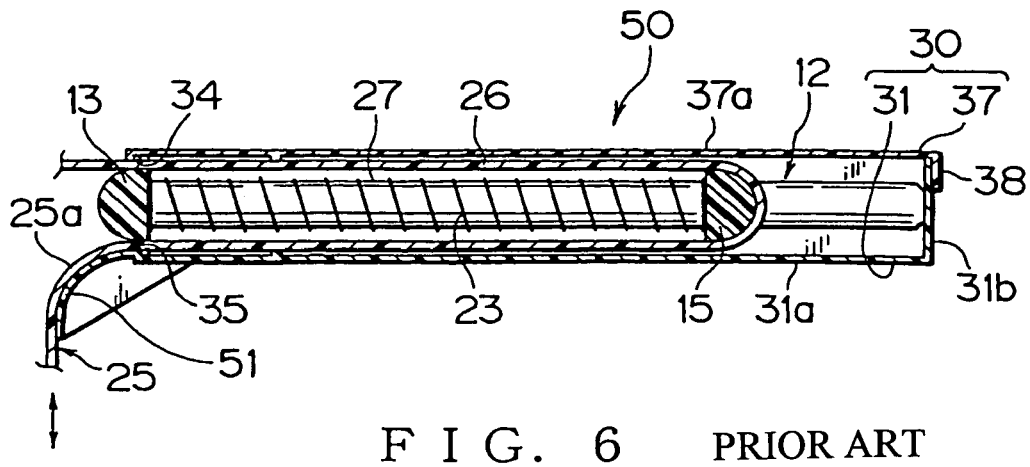
FIG. 6 is a sectional view showing an embodiment of a conventional wire harness excessive length absorbing device.

Since the harness inlet 34 and the harness outlet 35 are formed in the directions perpendicular to each other, the wire harness 25 is prevented from interfering with itself. As shown in FIG. 3, the wire harness 25 is folded at 90 degree and pulled into the case 30 through the harness inlet 34.

The wire harness 25 is turned in a U-shape in the case body 31, and pulled out through the harness outlet 35. After the excessive length 26 of the wire harness 25 is received in the case body 31, the wire harness 25 at the harness inlet 34 side is at rest, and only the wire harness 25 at the harness outlet 35 side reciprocally moves to be pulled in and out.

The wire harness 25 received in the case body 31 is constantly urged in a direction of pulling the wire harness 25 inward. Therefore, the wire harness 25 is pulled out of the case 30 by pulling the wire harness 25 at the harness outlet 35 side from outside. When stopping pulling the wire harness 25 out, the force of the compressed coil spring 23 pulls the excessive length 26 of the wire harness 25 back into the case body 31.

A harness guide 17 for guiding the wire harness 25 downward is formed consecutively on the harness outlet 35. One of characteristic features of the present invention is that the harness guide 17 is curved in the same direction as the wire harness 25 rolled on the harness roller 15, namely, a counterclockwise direction.

The wire harness 25 pulled into the case 30 from the harness inlet 34 is turned in a U-shape in the counterclockwise direction on the harness roller 15. Then, the wire harness 25 is further turned 90 degrees by the harness guide 17 in the same counterclockwise direction and pulled out of the case 30.

Since the harness guide 17 is turned in an arc shape at the harness inlet 34 side, the length of the protrusion of the harness guide 17 outward from the case 30 is allowed to be small and the case 30 is allowed to be slim.

On the other hand, the conventional harness guide 51 protrudes outward from the case 30. Therefore, the case 30 is thick, and not allowed to be slim. When the door or the like is open and the wire harness 25 is pulled outward, the wire harness 25 is turned in a clockwise direction on the harness roller 15 and then turned in the counterclockwise direction by the harness guide 51. Therefore, the wire harness turned in an S-shape is pulled out. Accordingly, sliding resistance of the pulled wire harness 25 increases. The wire harness 25 is not easily pulled out, and may be broken.

According to the present invention, owing to the harness guide 17, the wire harness 25 is not turned in the S-shape, and pulled out of the case 30 in the round path. Therefore, the case 30 is allowed to be slim, and the wire harness 25 is smoothly pulled out of the case 30. Therefore, the wire harness 25 is prevented from being broken.

Further, the radius of corner of the curved harness guide 17 is formed to be equal to or less than the thickness of the case 30. Therefore, pulling out the wire harness 25 along the harness guide prevents the concentration of repeated bending stress.

Since the wire harness 25 is resilient, even if the wire harness 25 is turned in a corner radius equal to a trunk 15a (FIG. 4) of the harness roller 15, electric connection reliability of the wire harness 25 is not spoiled. However, a larger corner radius increases the electric connection reliability of the wire harness 25.

The cover 37 is formed in a shape so as to cover the opening of the case body 31. The cover 37 includes a ceiling wall 37a and frame walls 38 extending downward from edges of the ceiling wall 37a. A bottom of the cover 37 is formed open. Locking projections 38a (FIG. 5) are formed on the frame walls 38 of the cover 37 for engaging with the locking pieces 32 formed on the frame walls of the case body 31.

Since the case 30 absorbs the excessive length 26 of the wire harness 25, the excessive length 26 is prevented from being in a U-shape, and exposed to the outer interference to be broken or damaged. Further, the ceiling wall 37a and the base wall 31a facing to each other prevent the absorbed excessive length 26 from lifting.

The excessive length absorbing unit 12 includes a seat member 13, the guiding pin 27, the compressed coil spring 23 surrounding the guiding pin 27, and the harness roller 15 around which the wire harness 25 is rolled in a U-shape.

The guiding pin 27 is a straight member in a bar shape, and made of synthetic resin. One end of the guiding pin 27 is a fixed end to the rear wall 31c of the case body 31. The other end of the guiding pin 27 is a free end, however, fixed to the harness roller 15.

A length of the guiding pin 27 is formed shorter than that of the case 30. That is because if the guiding pin 27 is longer than the case 30, the case 30 cannot receive the guiding pin 27. Further, a maximum outer diameter of the guiding pin 27 is formed smaller than an inner diameter of the compressed coil spring 23. That is because if the maximum outer diameter is larger than the inner diameter of the compressed coil spring 23, the compressed coil spring 23 cannot receive the guiding pin 27 inside.

The compressed coil spring 23 is formed of many turns of a wire in a cylinder shape. A pair of the compressed coil springs 23 are disposed in parallel with each other (only one compressed coil spring 23 is shown in FIG. 1). Arranging the pair of the compressed coil springs 23 allows the harness roller 15 to move reciprocally while balancing. This is due to an increase of following ability of the wire harness 25 to a movable door being opened and closed, because the pair of the compressed coil springs 23 increases the urging force and the wire harness 25 is pulled into the case 30 swiftly. Further, the pair of the compressed coil springs 23 are prevented from being deformed and a fatigue life of the compressed coil spring 23 is increased in use for a reciprocally opened and closed door.

A length of the compressed coil spring 23 in a free state is about one-and-a-half times longer than that of the guiding pin 27. When the length of the compressed coil spring 23 is too long, pulling force to pull the wire harness 25 inward is large so that the wire harness 25 is easier to be pulled inward. However, pulling force to pull the wire harness 25 outward is required to be large so that the wire harness 25 is harder to be pulled outward.

Conversely, when the length of the compressed coil spring 23 is too short, the force to pull out the wire harness 25 inward is small so that the wire harness 25 is easier to be pulled outward. However, since the force to pulled the wire harness 25 inward is weak, the wire harness 25 is harder to be pulled inward. Accordingly, in this embodiment, for pulling the wire harness 25 both inward and outward smoothly, the length of the compressed coil spring 23 is predetermined to be about one-and-a-half times longer than that of the guiding pin 27. Similarly, the numbers of turns of the compressed coil spring 23 and a diameter of the wire are predetermined so as to pull the wire harness 25 both inward and outward smoothly.

Using the compressed coil spring 23 as the urging member, interposing the wire harness 25 between the pair of the compressed coil springs 23, and rolling the wire harness 25 in a U-shape allows the length of the case to be about half the length of the excessive length 26 of the wire harness 25. Therefore, there is a merit that the case 30 can be miniaturized. Conventionally, the case 30 having the compressed coil spring 23 is large and heavy. According to the present invention, such a problem is solved.

Figure 4:
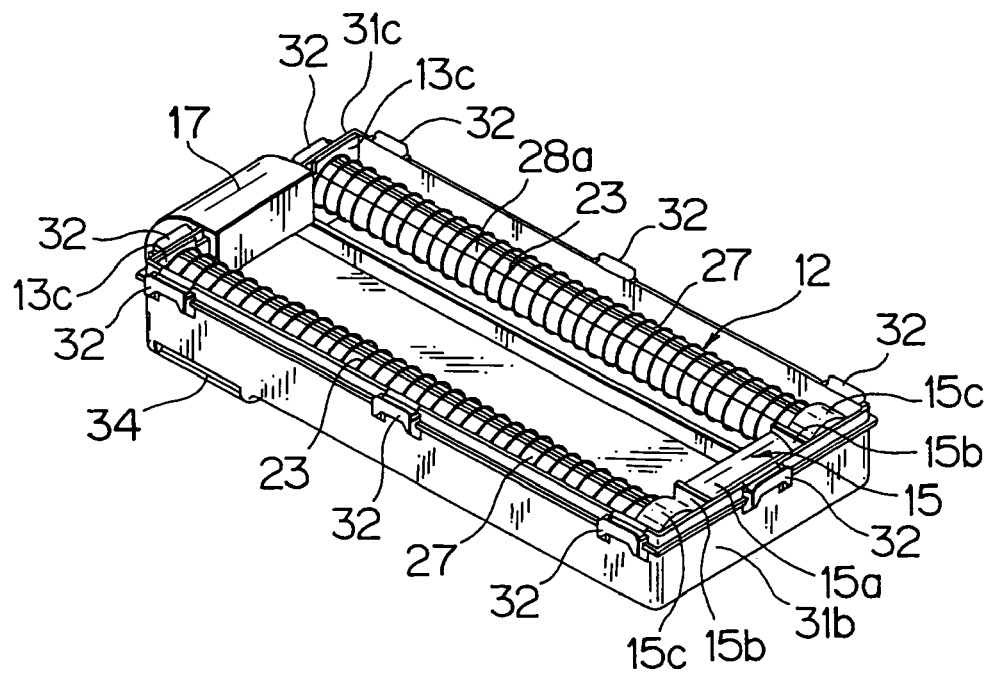
FIG. 4 is a perspective view showing a case body receiving an excessive length absorbing unit of the wire harness excessive length absorbing device according to the present invention.
Figure 5:
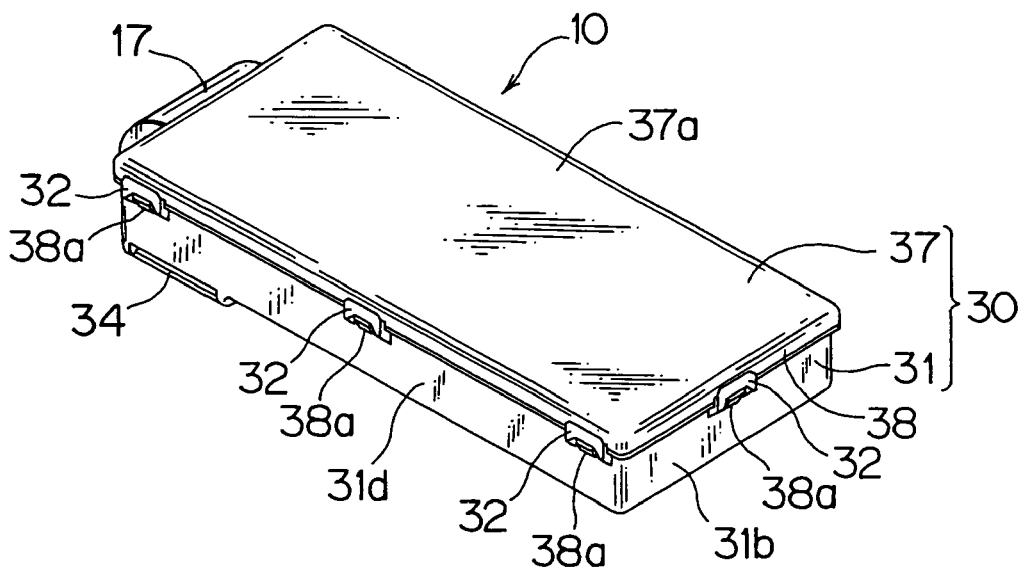
FIG. 5 is a perspective view showing the case body covered by a cover according to the present invention.

As shown in FIG. 4, the harness roller 15 is made of synthetic resin, and includes the trunk 15a, the separators 15b, and the frames 15c continuing to the both sides of the trunk 15a and attached to the guiding pins 27. The trunk 15a and the frames 15c continue to each other through the separators 15b. The harness roller 15 moves reciprocally along the guiding pins 27 while urged by the compressed coil springs 23.

The wire harness 25 is rolled in a U-shape on the trunk 15a. An outer convex wall is formed at one side of the trunk 15a. An inner flat wall is formed at the other side of the trunk 15a. The wire harness 25 being smoothly bendable along the concave wall is prevented from being folded, thereby stress concentration caused at a folded part of the wire harness 25 is avoided.

The separators 15b projecting from both ends of the trunk 15a position the wire harness 25 rolled around the trunk 15a so as not to displace the wire harness 25 laterally.

The frames 15c each having a frame shape continue to the both sides of the trunk 15a through the separators 15b. A tip of the guiding pin 27 is attached to an inside of each frame 15c. The frame 15c is movable reciprocally on the guiding pin 27, but not slips out of the guiding pin 27 after attached to the guiding pin 27. Since an engagement structure between the frame 15c and the guiding pin 27 will be explained in detail by another patent application, the explanation of the structure is omitted in this description.

Next, an assembling of the wire harness excessive length absorbing device 10 will be explained. FIG. 4 shows the case body 31 receiving the excessive length absorbing unit 12. FIG. 5 shows the case body 31 covered by the cover 37.

Firstly, the compressed coil spring 23 covers the guiding pin 27 attached to the seat member 13. Resultingly, the compressed coil spring 23 projects from the tip of the guiding pin 27. This is because the length of the compressed coil spring 23 is about one-and-a-half times longer than that of the guiding pin 27.

The harness roller 15 is attached to the tip of the guiding pin 27, thereby the compressed coil spring 23 is compressed and a tip of the compressed coil spring 23 contacts the end of the harness roller 15. FIG. 4 shows the compressed coil spring 23 being compressed. A locking member locks the harness roller 15 and the guiding pin 27 so as not to slip out and retain the compression of the compressed coil spring 23. Further, a not-shown rib prevents the harness roller 15 from shifting laterally in a radial direction of the compressed coil spring 23.

Then, while the compressed coil spring 23 is compressed to be shorter than the length of the case 31, the case body 31 is assembled with the absorbing unit 12. Then, as shown in FIG. 5, the cover 37 covers the opening of the case body 31, and the locking pieces 32 engage with the locking projections 38a. Thus, the wire harness excessive length absorbing device 10 is assembled completely.

The wire harness 25 has the absorbed excessive length 26 received in the case 30. The wire harness 25 is firstly pulled into the case 30 through the harness inlet 34 mounted on the sidewall 31d of the case body 31. Then, the wire harness 25 is rolled in a U-shape on the harness roller 15, pulled out of the case 30 through the harness outlet 35 mounted on the rear wall 31c of the case body 31, and guided downward along the harness guide 17 continued to the harness outlet 35.

The lead-out wire harness 25 is connected to a connector harness connected to such as a vehicle door, and the electric components of a vehicle so as to supply electricity or signal currents.

According to this embodiment described the above, since the harness guide 17 having the arc shape is turned toward the harness inlet 34, and turned in the same direction as the wire harness 25 rolled on the harness roller 15, the length of the protrusion of the harness guide 17 outward from the case 30 is allowed to be reduced, and the case 30 is allowed to be slim.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

Since the harness guide for guiding the wire harness outward has a curve shape toward the harness inlet, the length of the protrusion of the harness guide outward from the case is reduced. Thereby, the case body becomes slim. Therefore, the wire harness excessive length absorbing device according to the present invention is applicable in a narrow space for components.

The invention claimed is:

1. A wire harness excessive length absorbing device comprising:
  a case, having a base wall, front wall, rear wall, pair of side walls and a cover, for receiving a wire harness having an inlet formed in a side wall adjacent the rear wall, and an outlet formed in the rear wall for the wire harness;
  an urging member for urging the wire harness toward an inside of the case; and
  a harness roller about which the wire harness is rolled in a U-shape, said harness roller reciprocally moving under acting force of the urging member, and a harness guide mounted on the outlet formed in the rear wall and curved toward the inlet for guiding the harness to the outside of the case, such that the wire harness is pulled into the case from the harness inlet and turned in the U-shape about the wire harness roller and further turned by the harness guide and pulled out of the case.

2. The wire harness excessive length absorbing device as claimed in claim 1, wherein the harness guide is curved in the same direction as a direction of the wire harness being rolled on the harness roller.

3. The wire harness excessive length absorbing device as claimed in claim 1, wherein a radius of corner of the harness guide is formed equal to or larger than a thickness of the case.

4. The wire harness excessive length absorbing device as claimed in claim 1,
wherein the outlet is disposed in a direction perpendicular to that of the inlet.

* * * * *